United States Patent
Nagao (10) Patent No.: US 7,735,227 B2
(45) Date of Patent: Jun. 15, 2010

(54) METHOD FOR PROVIDING A LUBRICATING LAYER TO A BEARING

(75) Inventor: Shouji Nagao, Kamakura (JP)

(73) Assignee: Nippon Thompson Co., Ltd., Minato-Ku, Tokyo (JP)

( * ) Notice: Subject to any disclaimer, the term of this patent is extended or adjusted under 35 U.S.C. 154(b) by 557 days.

(21) Appl. No.: 11/679,456

(22) Filed: Feb. 27, 2007

(65) Prior Publication Data

US 2007/0217723 A1      Sep. 20, 2007

(30) Foreign Application Priority Data

Mar. 15, 2006    (JP) .............................. 2006-070810

(51) Int. Cl.
*B21D 53/10* (2006.01)
*B21K 1/76* (2006.01)

(52) U.S. Cl. .................. 29/898.1; 29/898; 384/463; 384/470

(58) Field of Classification Search ........ 29/898–898.15; 384/572, 462, 463, 470, 467
See application file for complete search history.

(56) References Cited

U.S. PATENT DOCUMENTS

| | | | | |
|---|---|---|---|---|
| 3,710,471 A | * | 1/1973 | Pitner | 29/898.066 |
| 3,844,010 A | * | 10/1974 | Frost et al. | 29/898.07 |
| 3,857,148 A | * | 12/1974 | Hata | 29/898.062 |
| 3,998,505 A | * | 12/1976 | Frost et al. | 384/510 |
| 4,685,184 A | * | 8/1987 | Satkamp | 29/898.1 |
| 4,886,377 A | * | 12/1989 | Adachi et al. | 384/49 |
| 5,688,054 A | * | 11/1997 | Rabe | 384/295 |
| 5,740,893 A | * | 4/1998 | Yamamoto | 192/45 |
| 6,296,393 B1 | * | 10/2001 | Yabe et al. | 384/463 |
| 6,315,456 B1 | * | 11/2001 | Tanimoto et al. | 384/527 |
| 7,234,873 B2 | * | 6/2007 | Kato et al. | 384/572 |

FOREIGN PATENT DOCUMENTS

| | | |
|---|---|---|
| JP | 11-153144 | 6/1999 |
| JP | 2004-257491 | 9/2004 |

\* cited by examiner

*Primary Examiner*—Rick K Chang
(74) *Attorney, Agent, or Firm*—Cozen O'Connor (57) ABSTRACT

A method for forming a lubricating layer, comprising the steps of a process for inserting a bearing, which has a tubular-shaped retainer holding a plurality of rollers and inserted in an outer ring, in a forming die having an inner diameter greater than an outer diameter of the outer ring of the bearing; a process for feeding a fluid lubricant including a thermoplastic resin into the forming die; a process for reducing pressure in the forming die with the fluid lubricant fed therein to remove air bubbles included in the fluid lubricant; a process for pressing a cylindrical elastic solid, which has an outer shape greater than a minimum inner diameter of the retainer, into an inscribed circle in which the plurality of rollers are inscribed; and a process for heating and setting the thermoplastic resin to form a lubricating layer.

1 Claim, 10 Drawing Sheets

METHOD FOR PROVIDING A LUBRICATING LAYER TO A BEARING

BACKGROUND OF THE INVENTION

1. Field of the Invention

This invention relates to a bearing equipped with a lubricating layer and a method for providing a lubricating layer to a bearing.

2. Description of the Related Art

Conventional bearings equipped with a lubricating layer include the bearings disclosed in JP-A-2004-257491 and JP-A-H11-153144. The conventional bearings will be described with reference to FIG. 7 to FIG. 10.

Figure 7:
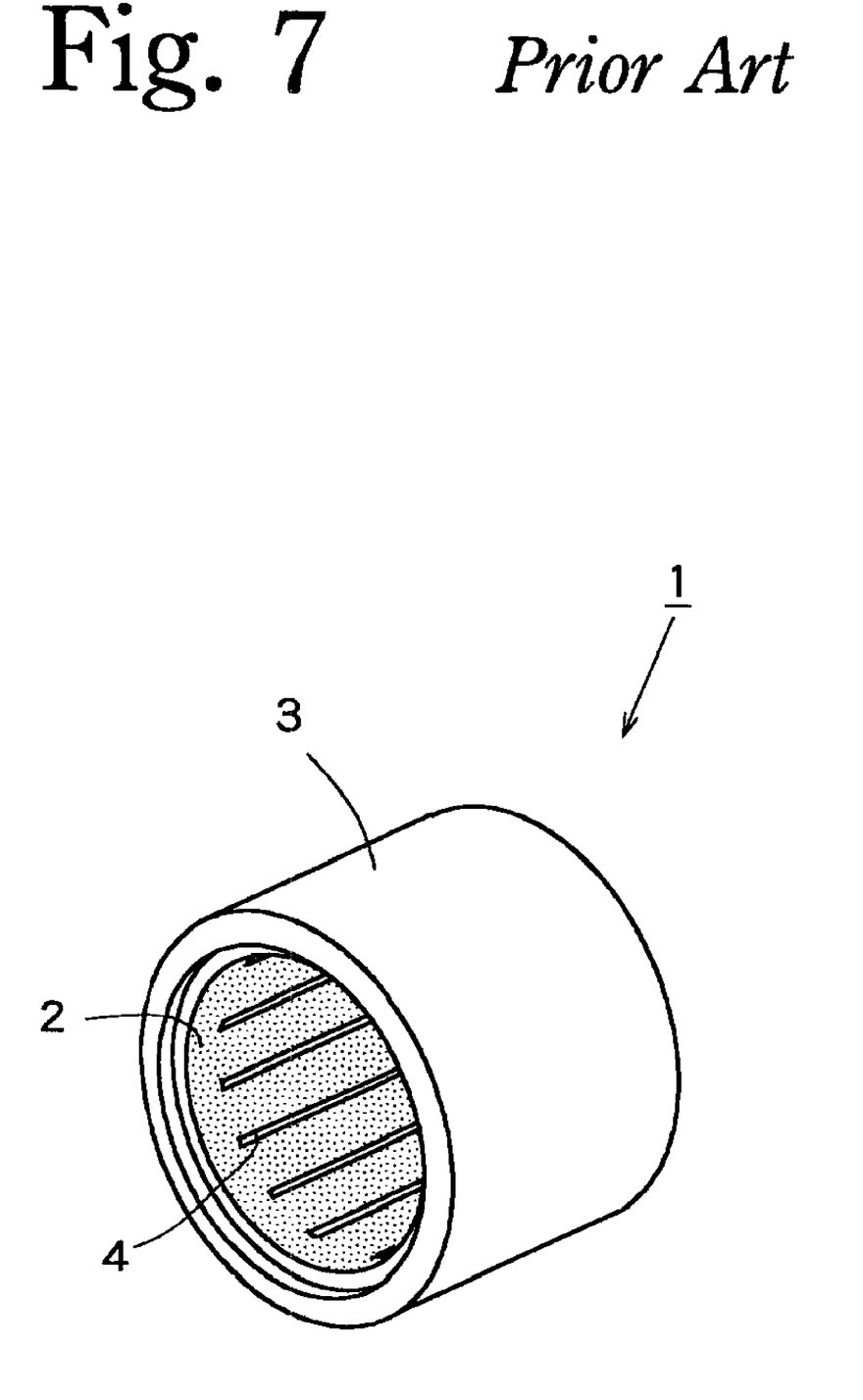
FIG. 7 is a view illustrating a conventional bearing.

The bearing 1 illustrated in FIG. 7 comprises a tubular retainer 2 fitted in an outer ring 3. The retainer 2 has a plurality of roller-retaining holes formed therein, each of which extends in the axis direction thereof, and arranged at regular intervals on the circumference. Needle rollers 4 are rotatably retained in the respective roller-retaining holes.

Figure 8:
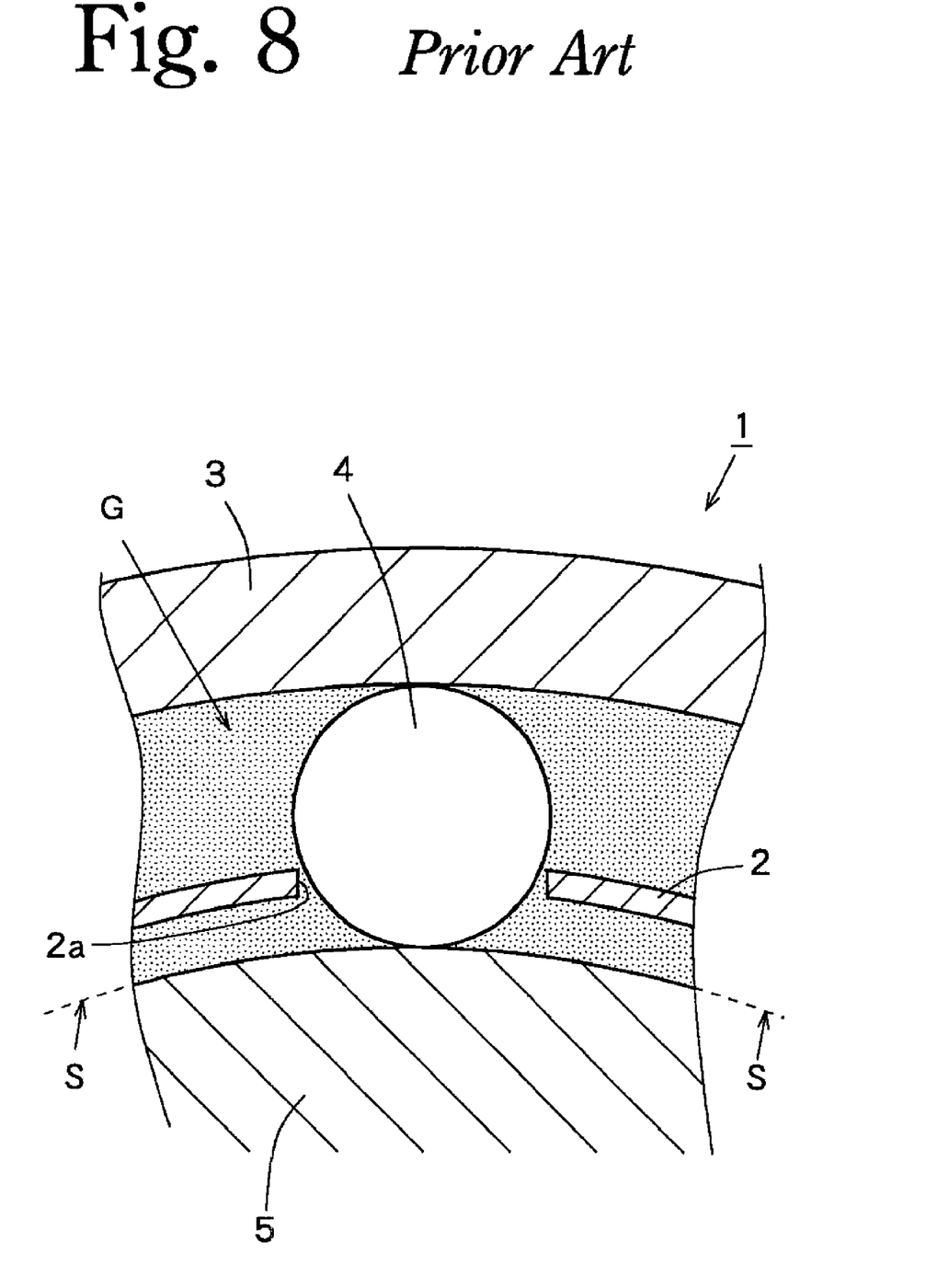
FIG. 8 is a sectional view with enlargement of a portion of the conventional bearing.

As shown in FIG. 8, a shaft 5 is inserted in the above bearing 1, in which the rollers 4 are interposed between the outer ring 3 and the shaft 5, and the rollers 4 rotate between the outer ring 3 and the shaft 5 so as to make their relative rotation smooth.

A lubricating layer G made of a solid lubricant is provided uniformly in the bearing 1. Accordingly, the outer periphery faces of the rollers 4 are always covered with oil or the like impregnated in the lubricating layer G. As a result, the relative rotation between the rollers 4 and the outer ring 3 and the relative rotation between the rollers 4 and the shaft 5 are made smooth and frictional heat is not generated in the contact portions between the rollers 4 and them. Reference letter S in FIG. 8 denotes an inscribed circle. The inscribed circle here means a virtual circle on which the shaft 5 comes into contact with all the rollers 4 held in the retainer 2. However, two circles in contact with all the rollers 4 are formed on the inside and the outside of the rollers 4, and the inscribed circle in this case means the circle formed on the inside of the rollers 4, which is approximately aligned with the outer periphery of the shaft 5 in FIG. 8.

Figure 9:
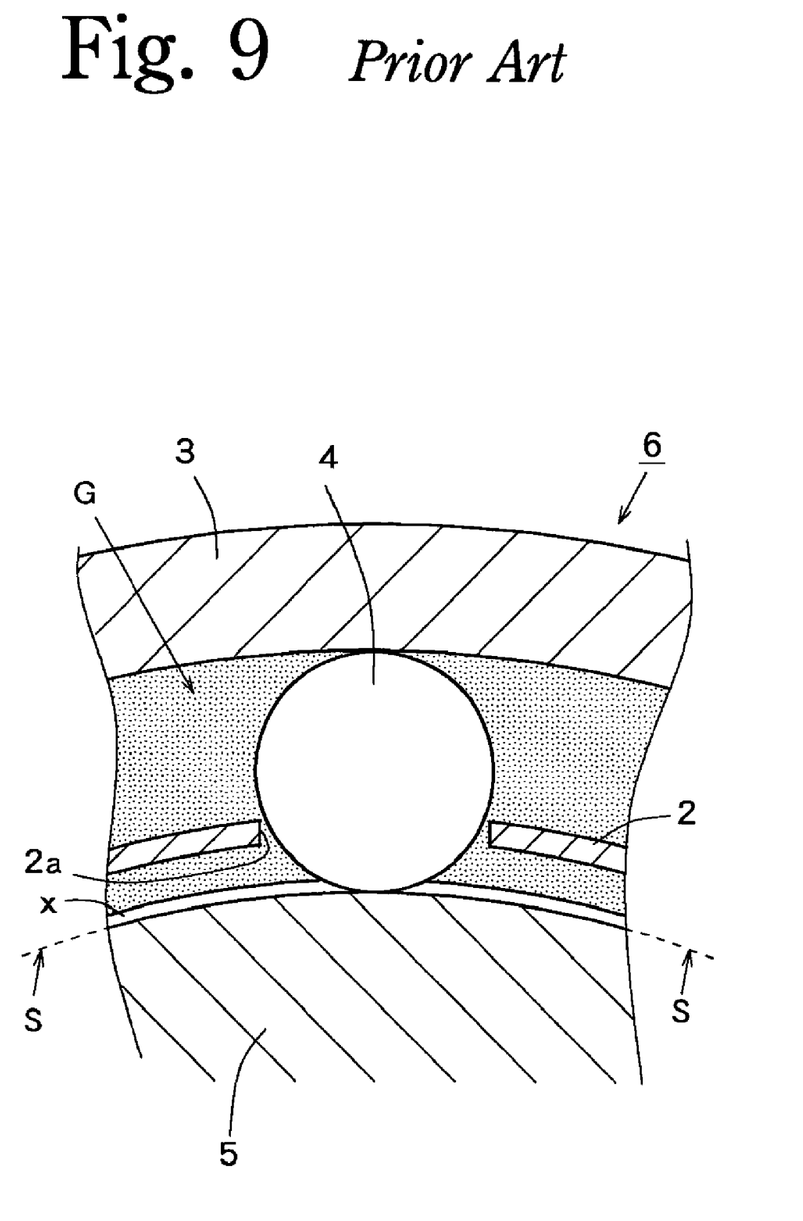
FIG. 9 is a sectional view with enlargement of a portion of another conventional bearing.

Another bearing 6 illustrated in FIG. 9 has a slight space x extending from the outer periphery of the shaft 5 toward the retainer 2 in which the lubricating layer G is not formed. Such provision of a slight area without the lubricating layer G prevents the lubricating layer G from making its way into the gap between the roller 4 and the rolling face of the shaft 5.

Next, the method of providing the lubricating layer G in each of the bearings 1, 6 will be described.

Figure 10:
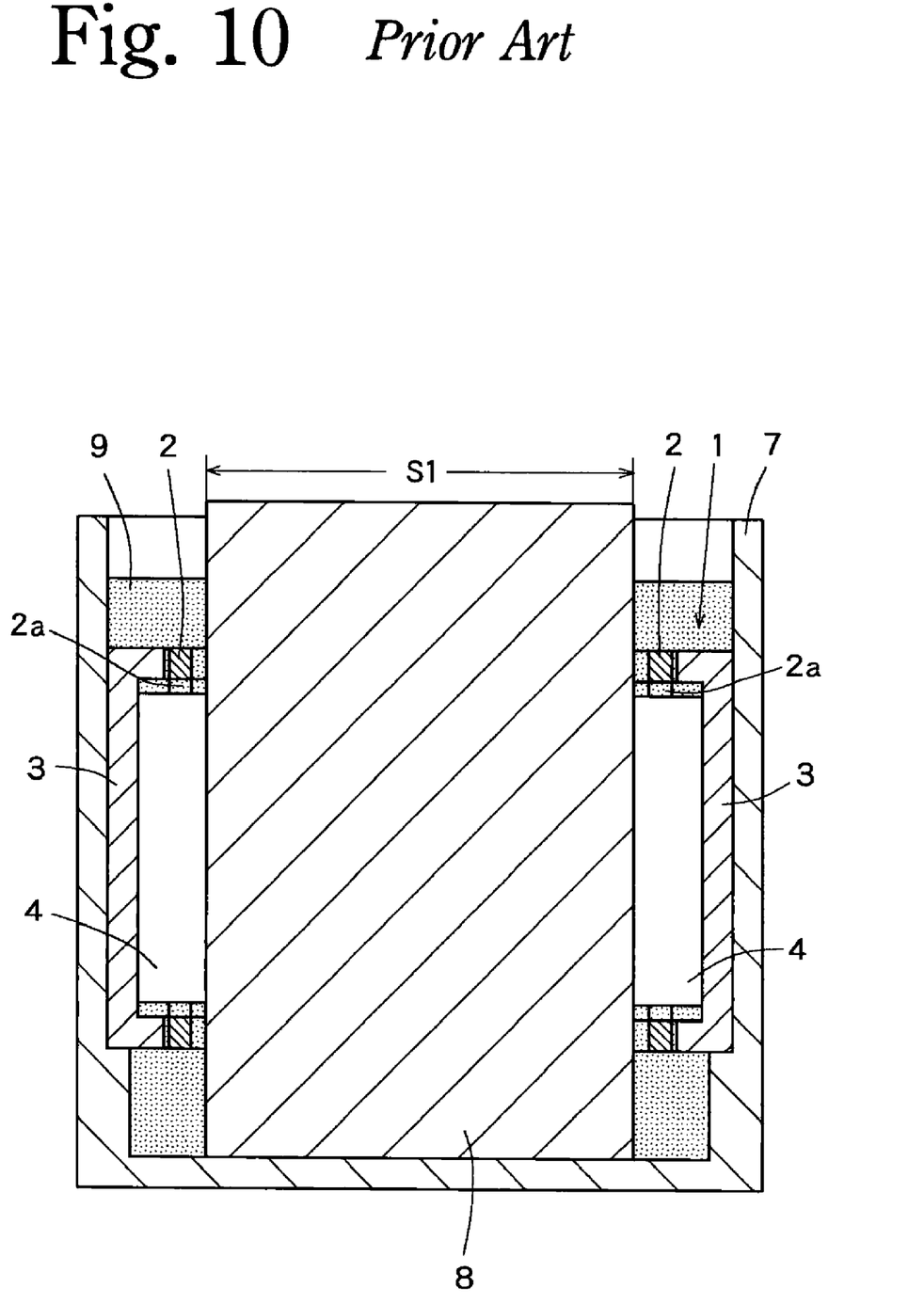
FIG. 10 is a view illustrating a method for forming a lubricating layer on the conventional bearing.

First, the retainer 2 is inserted in the outer ring 3 and the rollers 4 are inserted in the roller-retaining holes 2a from the inside of the retainer 2 to form the bearing 1. Then, the bearing 1 is inserted in a forming die 7 having an internal diameter approximately equal to the outer diameter of the outer ring 3, and then an aluminum-made shaft member 8 having a shaft diameter equal to or slightly smaller than the roller-set-bore diameter S1 of the plurality of rollers 4 in the bearing 1 is inserted in the bearing 1 (the inscribed circle S). Here, the roller-set-bore diameter S1 means the diameter of the inscribed circle S formed by the plurality of rollers 4 held in the retainer 2.

At this stage, a fluid lubricant 9 including a thermoplastic resin is fed into the forming die 7 so as to fill the empty space created in the bearing 1 with the fluid lubricant 9. Then, the inside of the forming die 7 is hermetically sealed and reduced in pressure or remove any air bubbles included in the fluid lubricant 9. Then, the entire forming die 7 is heated to about 150° C., thermally setting the thermoplastic resin included in the fluid lubricant 9.

With this method, as is seen from FIG. 7 and FIG. 8, the lubricating layer G can be uniformly formed in each area between the outer ring 3 and the retainer 2, between the roller-retaining holes 2a and the rollers 4 and between the inscribed circle S of the rollers 4 (the shaft 5) and the retainer 2, except for the contact portions between the outer ring 3 and the rollers 4 and the slight contact portions between the shaft 5 and the rollers 4.

In the process of forming the lubricating layer G in the bearing 6, a spacer (not shown) is attached to the inside of the bearing 6, whereby a space x in which the lubricating layer G is not formed is created in a range from the inscribed circle S of the rollers 4 in correspondence with the thickness of the spacer. Accordingly, as is seen from FIG. 9, the lubricating layer G can be uniformly formed in the bearing 6, except for the contact portions between the outer ring 3 and the rollers 4 and the slight space x extending from the inscribed circle S toward the retainer 2. In other words, it is possible to positively ensure the existence of a space x corresponding to the thickness of the spacer.

In the bearing 1 in the initial state, the lubricating layer G is provided uniformly on approximately the full periphery of each of the rollers 4, except for a slight area including the contact portions between the outer ring 3 and the rollers 4 and the contact portions between the shaft 5 and the rollers 4. That is, in the initial state the lubricating layer G is in close contact with approximately the full periphery of the roller 4. In the initial state of close contact between the lubricating layer G and approximately the full periphery of the roller 4, the close-contact force of the lubricating layer G on the roller 4 is large. Therefore, when the rollers 4 roll in the initial state, the rollers 4 require a large torque because of the effect of the close-contact force. Because of this requirement, when the outer ring 3 is rotated at a small load in this initial state, the rollers 4 do not roll smoothly, so that the rollers 4 and tree outer ring 3 come into sliding contact with each other. Such sliding contact between the rollers 4 and the outer ring 3 generates frictional heat, possibly causing seizing up between the rollers and the outer ring 3 and/or plastic deformation of the contact portion. To avoid this, in the initial state when the bearing 1 is used, the imposition of a load of 1% or more of the basic dynamic load rating is indispensable for providing the normal rotation.

On the other hand, in the bearing 6 with the space x created as described earlier, the area of the lubricating layer G which is in contact with the outer periphery surface of the rollers 4 is reduced by the space x as compared with the case of the bearing 1. For this reason, even in the initial state, the bearing 6 enables the rotation of the rollers 4 with a small torque. As a result, the minimum bearing load imposed on the bearing 6, which is required in the initial state, is smaller than in the case of the bearing 1.

However, for the bearing 6, a spacer is required for creating the space x when the lubricating layer G is formed. In the case of the bearing 6, a plurality of spacers is arranged in each bearing 6 in the process of forming the lubricating layer G. This gives rise to an increase in the manufacturing cost.

Further, the spacers are small items and the required number of spacers for each bearing corresponds to the number of intervals between the adjacent rollers 4. Therefore, as well as the process of arranging the spacers being difficult, the number of man-hours is increased, increasing the manufacturing cost.

SUMMARY OF THE INVENTION

A first object of the present invention is to provide a lubricating-layer-equipped bearing which enables a reduction in the minimum bearing load required in the initial operation, low-cost manufacture, and a simple assembly process.

A second object of the present invention is to provide a method for simply providing a lubricating layer to a lubricating-layer-equipped bearing.

The present invention provides a lubricating layer-equipped bearing comprising a tubular-shaped retainer that holds a plurality of rollers and is inserted in an outer ring; and a lubricating layer formed of a solid lubricant and provided inside the outer ring for lubricating the surfaces of the rollers. The lubricating layer-equipped bearing according to the present invention is characterized in that the lubricating layer is not provided in an area extending from an inscribed circle in which the plurality of rollers are inscribed to a minimum inner periphery face of the retainer to provide a non-lubricating space.

Further, the present invention provides method for forming a lubricating layer in the above bearing, which is characterized by comprising the steps of: a process for inserting the bearing, which has the tubular-shaped retainer holding a plurality of the rollers and inserted in the outer ring, in a forming die having an inner diameter greater than an outer diameter of the outer ring of the bearing; a process for feeding a fluid lubricant including a thermoplastic resin into the forming die; a process for reducing pressure in the forming die with the fluid lubricant fed therein to remove air bubbles included in the fluid lubricant; a process for pressing a cylindrical elastic solid, which has an outer shape greater than a minimum inner diameter of the retainer, into an inscribed circle in which the plurality of rollers are inscribed; and a process for heating and setting the thermoplastic resin to form the lubricating layer.

According to the present invention, the non-lubricating space in which the lubricating layer is not provided is provided between the inscribed circle in which a plurality of rollers are inscribed and the minimum inner periphery face of the retainer. In other words, the minimum inner periphery face of the retainer is determined on as the deepest level of the non-lubricating space. Because of this, for example, if an elastic solid is pressed from the inscribed circle in which the rollers are inscribed into the minimum inner periphery face of the retainer and then the lubricating layer is formed for providing the non-lubricating space, it is possible to easily form this space. In consequence, it is possible to manufacture a bearing maintaining a non-lubricating space at a significantly reduced cost as compared with the case of the conventional bearings. In other words, it is possible to offer a bearing significantly reduced in manufacturing costs while maintaining the non-lubricating space.

In addition, because the non-lubricating space is provided as described above, the lubricating layer is out of close contact with the outer periphery face of the roller which projects into the non-lubricating space. This makes it possible to reduce the torque produced by the lubricating layer acting on the outer periphery face of the roller when the roller rolls, resulting in a reduction in the minimum bearing load required in the initial operation.

According to the present invention, a non-lubricating space is able to be easily created by simply pressing a cylindrical elastic solid with an outer shape greater than the minimum internal diameter of the retainer into the inscribed circle of a plurality of rollers. Accordingly, the necessity of preparing a lot of spacers or of arranging the spacers between the rollers for creating a non lubricating space as done conventionally is eliminated. This elimination of the use of spacers makes it possible to achieve a significant reduction in the manufacturing costs for the bearings as compared with the conventional methods of manufacturing the bearings.

DETAILED DESCRIPTION OF THE PREFERRED EMBODIMENTS

A first embodiment of the present invention will be described below with reference to FIGS. 1 to 4, in which the same structural elements as those of the conventional examples described in the related art are designated with the same reference numerals.

The bearing 10 illustrated in FIG. 1 comprises a tubular retainer 11, described later, fitted in an outer ring 3. The retainer 11 has a plurality of roller-retaining holes 11a formed therein, which each extend in the axis direction and are arranged at regular intervals on the circumference. Needle rollers 4 are rotatably retained in the respective roller-retaining holes 11a.

A shaft 5 is inserted in this bearing 10, in which the rollers are interposed between the outer ring 3 and the shaft 5 and the rollers 4 rotate between the outer ring 3 and the shaft 5 so as to make their relative rotation smooth.

The retainer 11 holds the rollers 4 in place to prevent the rollers 4 from falling out from between the outer ring 3 and the shaft 5. The structure of the retainer 11 will be described below with reference to FIG. 2.

Figure 1:
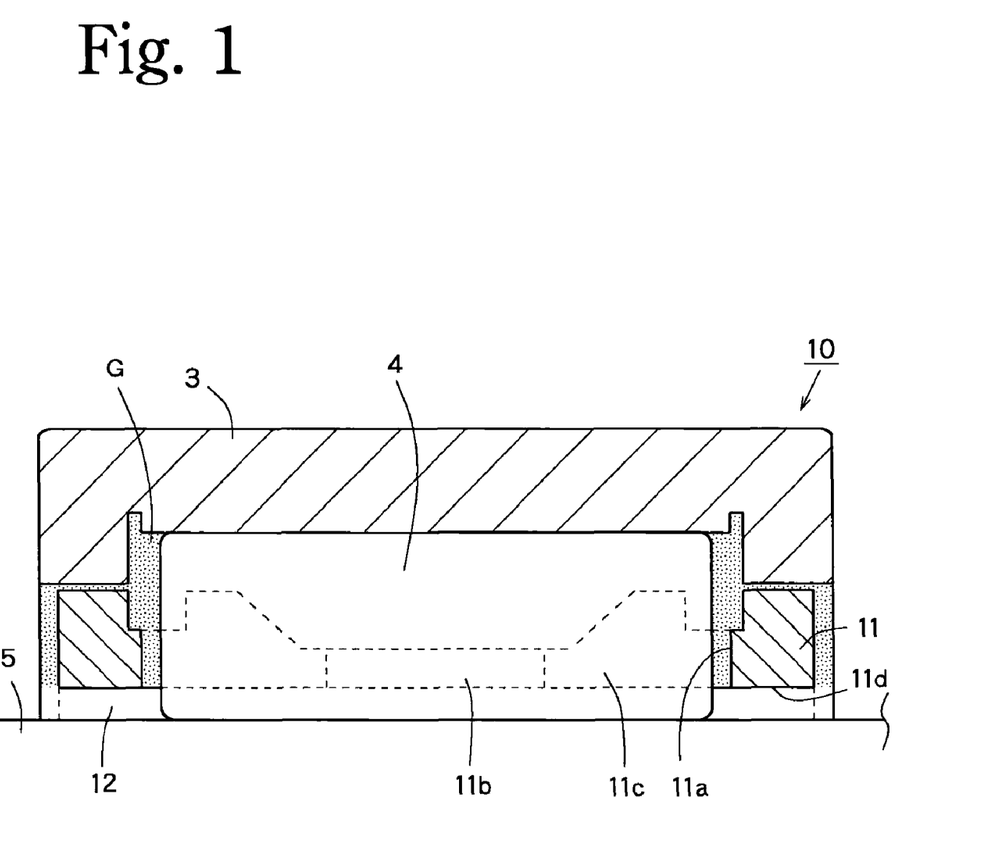
FIG. 1 is a sectional view illustrating a bearing with a shaft inserted therein in a first embodiment.
Figure 2:
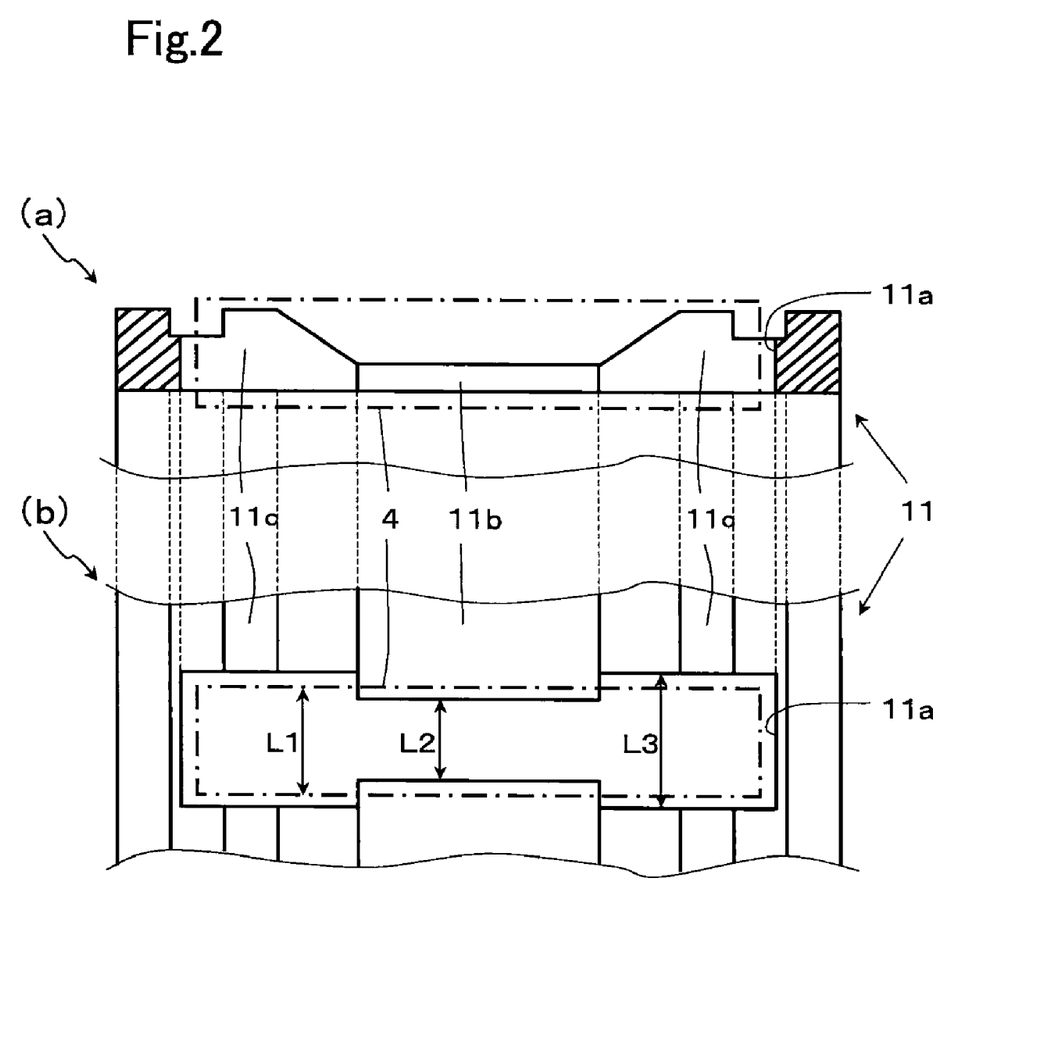
FIG. 2 is a diagram illustrating a retainer in the first embodiment.

Section (a) of FIG. 2 is a sectional view of the retainer 11 in the axis direction and section (b) of FIG. 2 is a plan view of a portion of the retainer 11. The roller 4 indicated by the line of alternating long and short dashes in FIG. 2 is held in a position, illustrated in FIG. 2, in the roller-retaining hole 11a of the retainer 11. This is because the roller 4 and the roller-retaining hole 11a are maintained in the following dimensional relationship. Specifically, the roller-retaining hole 11a has a bottom portion 11b having a width L2 and a guide portion lie having a width L3. The width L2 of the bottom portion 11b is slightly smaller than the diameter L1 of the roller 4, while the width L3 of the guide portion lie is slightly greater than the diameter L1 of the roller 4. Accordingly, when the roller 4 is placed in the roller-retaining hole 11a from above, as seen in section (a) of FIG. 2, the roller 4 is retained in the bottom portion 11b, with the upper portion of the roller 4 remaining free from the retainer 11. However, as shown in FIG. 1, when the retainer 11 is fitted in the outer ring 3, the roller 4 is retained between the inner periphery surface of the outer ring 3 and the bottom portion 11b, so as to prevent the roller 4 from falling out of the roller-retaining hole 11a.

Figure 3:
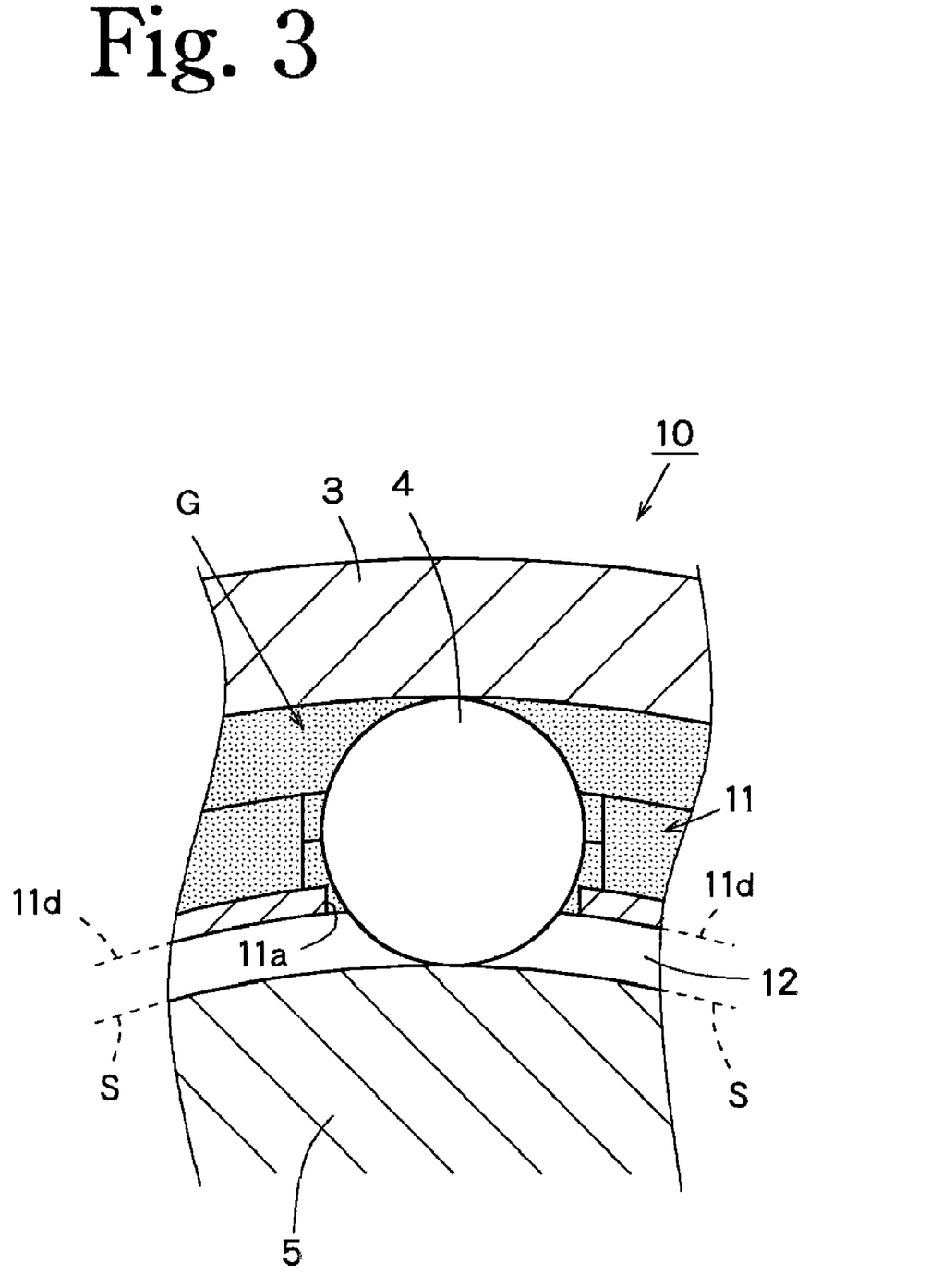
FIG. 3 is a sectional view with enlargement of a portion of the bearing in the first embodiment.

After the retainer 11 with the rollers 4 retained in the roller-retaining holes 11a as described above has been fitted in the outer ring 3, a lubricating layer G made of a solid lubricant is provided in the bearing 10, as described in FIG. 1 and FIG. 3. In the bearing 10 of the first embodiment, the lubricating layer G is not provided between the retainer 11 and the shaft 5. In other words, anon-lubricating space 12 without a lubricating layer G provided is formed between the minimum inner periphery surface 11d of the retainer 11 and the inscribed circle S of the plurality of rollers 4. As a result, the lubricating layer G dose not come into close contact with the outer periphery face of the roller 4 projecting from the minimum inner periphery face 11d of the retainer 11 toward the inscribed circle S.

Next, the operation of the bearing 10 in the first embodiment will be described.

The shaft 5 is fixed after having been inserted in the bearing 10. Then, the outer ring 3 and the shaft 5 are rotated while a load is imposed on the outer ring 3, whereupon the rollers 4 roll between the outer ring 3 and shaft 5. At this point, the outer peripheral faces of the rollers 4 are in contact with the lubricating layer G, so that the oil impregnated in the lubricating layer G lubricates the rollers 4, allowing for the smooth rolling of the rollers 4 and making the relative rotation between the outer ring 3 and the shaft 5 smooth.

However, in the non-lubricating space 12 created between the minimum inner periphery face lid of the retainer 11 and the inscribed circle S, the lubricating layer G is not provided.

In this manner, in the first embodiment, a non-lubricating space 12 without the lubricating layer G is provided between the inscribed circle S in which a plurality of rollers 4 are inscribed and the minimum inner periphery face lid of the retainer 11. In other words, the minimum inner periphery face lid of the retainer 11 is determined on as the deepest level of the non-lubricating space 12. Thus, the non-lubricating space 12 can be easily formed. Inconsequence, the bearing maintaining the non-lubricating space 12 enables a significant reduction in costs as compared with the case of the conventional bearings. In other words, it is possible to offer a bearing significantly reduced in manufacturing costs while maintaining the non-lubricating space 12.

In addition, because the non-lubricating space 12 is provided as described above, the lubricating layer G is out of close contact with the outer periphery face of the roller 4 which projects into the non-lubricating space 12. This makes it possible to reduce the torque produced by the lubricating layer G acting on the outer periphery face of the roller 4 when the roller 4 rolls, resulting in a reduction in the minimum bearing load required in the initial operation.

Figure 4:
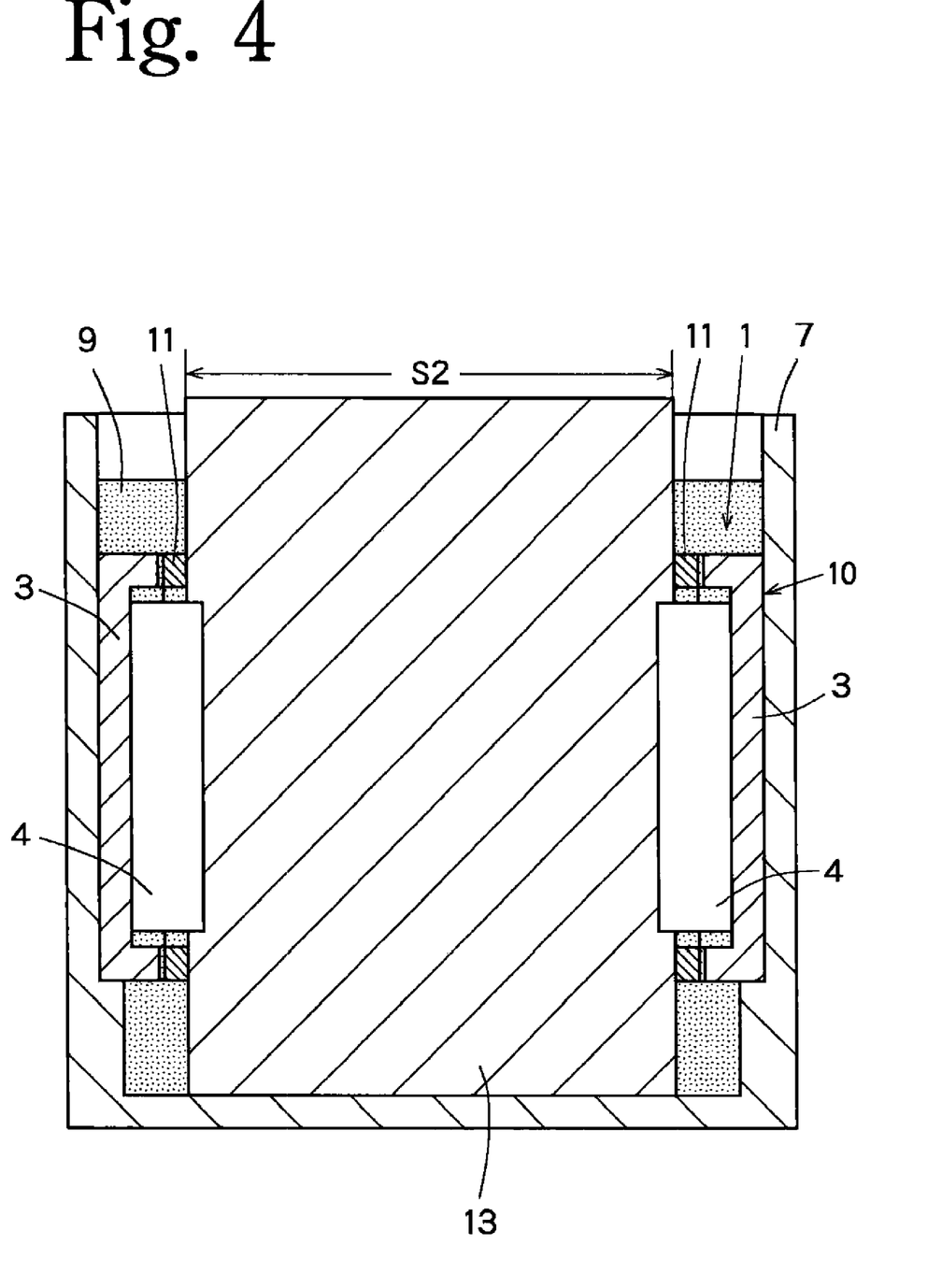
FIG. 4 is a diagram illustrating a method for forming a lubricating layer on the bearing in the first embodiment.

Next, a method for forming the lubricating layer G in the bearing 10 will be described with reference to FIG. 4.

First, the retainer 11 is inserted in the outer ring 3 and the rollers 4 are inserted in the roller-retaining holes 11a of the retainer 11 to form the bearing 10. Then, this bearing 10 is inserted in a forming die 7 having an internal diameter approximately equal to the outer diameter of the outer ring 3. Then, a fluid lubricant 9 including a thermoplastic resin is fed into the forming die 7 until the whole of the empty space created in the bearing 10 is filled with the fluid lubricant 9. Then, the inside of the forming die 7 is hermetically sealed and reduced in pressure to remove any air bubbles included in the fluid lubricant 9.

At this stage, a cylindrical elastic solid 13 having an axis diameter equal to or slightly greater than the minimum inner diameter S2 of the retainer 11 is pressed into the bearing 10 (the inscribed circle S). The minimum inner diameter S2 means the diameter of the minimum inner peripheral face 11d of the retainer 11. The elastic solid 13 is a member having thermal resistance and elasticity, such as silicon rubber, but the type of member is not particularly limited as long as it has thermal resistance and elasticity.

Upon the pressing of the elastic solid 13 into the bearing 1.0 (the inscribed circle S) as described above, as shown in FIG. 4, the elastic solid 13 changes the shape of the outer periphery face of the elastic solid 13 changes because of its elasticity. Specifically, the elastic solid 13 is pressed against the minimum inner periphery face lid of the retainer 11 and the rollers 4, and comes tightly into close contact with the minimum inner periphery face 11d and the rollers 4.

At this stage, the entire forming die 7 is heated to heat and set the thermoplastic resin included in the fluid lubricant 9. As a result, as shown in FIG. 3, the non-lubricating space 12 can be easily created and the lubricating layer G can be successfully formed uniformly in the bearing 10 except for the non-lubricating space 12. In either case, such easy creation of the non-lubricating space 12 is a consequence of determining on the minimum inner periphery face 11 of the retainer 11 as the deepest level of the non-lubricating space 12.

Next, a second embodiment of the present invention will be described with reference to FIG. 5 and FIG. 6. The second embodiment differs from the first embodiment only in the structure of the retainer 11, and the other structural elements and the method of forming the lubricating layer G in the second embodiment are the same as those in the first embodiment. The same structural elements in the second embodiment as those in the first embodiment are designated with the same reference numerals and a detailed description of the same structural elements is omitted.

Figure 5:
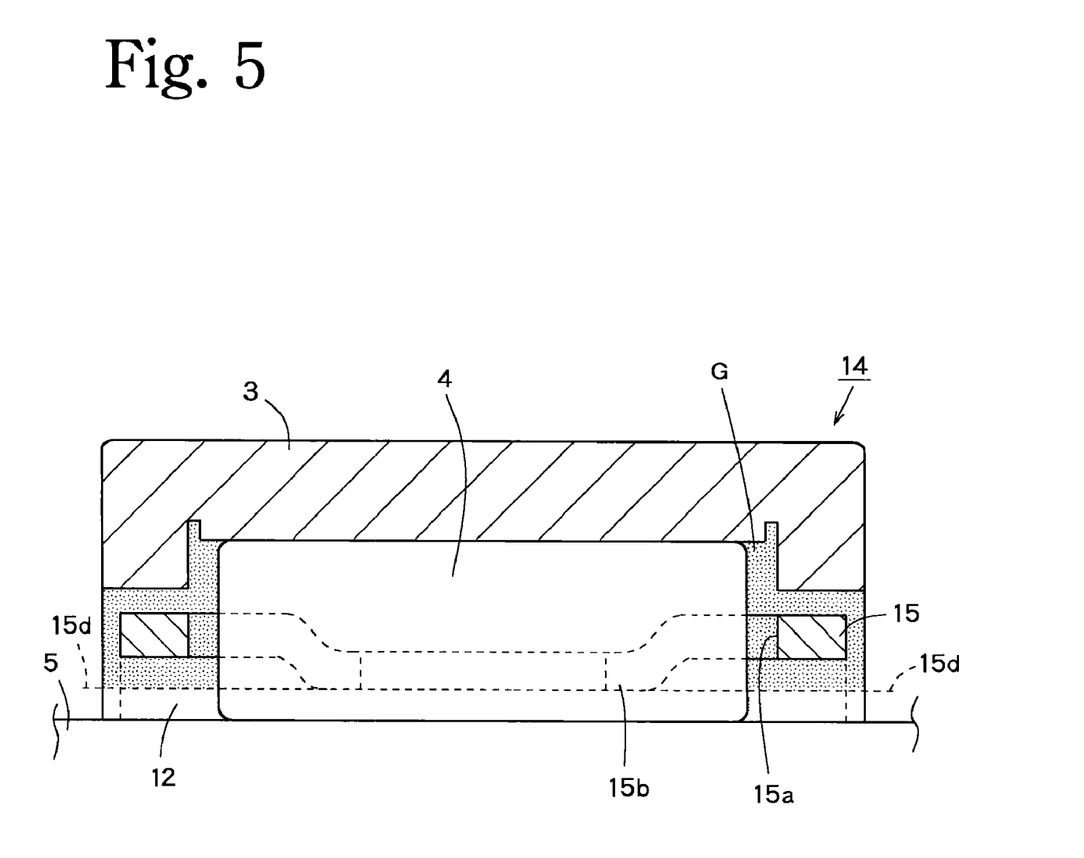
FIG. 5 is a sectional view illustrating a bearing with an inner ring inserted therein in a second embodiment.

A bearing 14 illustrated in FIG. 5 comprises a tubular retainer 15 fitted in an outer ring 3. The retainer 15 has a plurality of roller-retaining holes 15a formed therein, each of which extends in the axis direction, and arranged at regular intervals on the circumference. Needle rollers 4 are rotatably retained in the 25 respective roller-retaining holes 15a.

Figure 6:
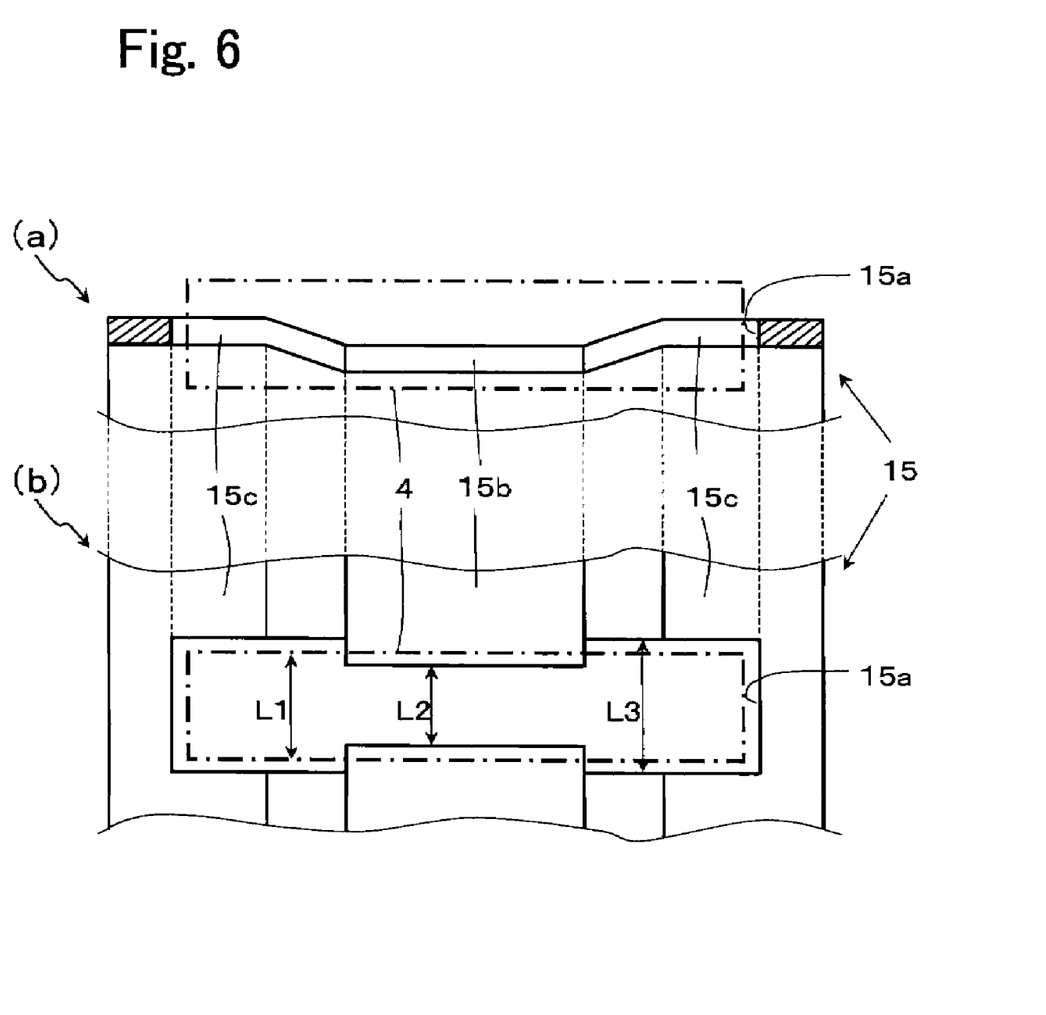
FIG. 6 is a diagram illustrating a retainer in the second embodiment.

FIG. 6 illustrates the retainer 15. Section (a) of FIG. 6 is a sectional view of the retainer 15 in the axis direction and section (b) of FIG. 6 is a plan view of a portion of the retainer 15. As seen from section (a) of FIG. 6, the retainer 15 is made of a plate-shaped member having a thin cross-sectional shape and having a recess formed in its axis-direction-central portion. The bottom of the recess forms the bottom portion 15b of the retainer 15, and the two sides of the bottom portion 15b form flat portions 15c. Each of the roller-retaining holes 15a extends across the bottom portion 15b between the flat portions 15c.

The roller-retaining hole 15a has a width L2 in a portion corresponding to the bottom portion 15b and a width L3 in a portion corresponding to the flat portion 15c. Assuming that the roller 4 indicated by the line of alternating long and short dashes in FIG. 6 has a diameter L1, the width L2 of the roller-retaining hole 15a in the bottom portion 15b is smaller than the diameter Li of the roller 4, while the width L3 of the roller-retaining hole 15a in the flat portion 15c is greater than the diameter L1 of the roller 4. Accordingly, when the roller 4 is placed in the roller-retaining hole 15a from above, when viewed as in section (a) of FIG. 6, the roller 4 is retained in the bottom portion 15b, with the upper portion of the roller 4 remaining free from the retainer 15. However, when the retainer 15 is fitted in the outer ring 3, as shown in FIG. 5, the roller 4 is retained between the inner periphery surface of the outer ring 3 and the bottom portion 15b, so as to prevent the roller 4 from falling out of the roller-retaining hole 15a.

After the lubricating layer G has been formed in the above-described bearing 14 using the elastic solid 13 as in the case of the first embodiment, a non-lubricating space 12 is created between the minimum inner periphery face 15d of the retainer 15 and the shaft 5 (the inscribed circle S) as shown in FIG. 5. This non-lubricating space 12 is a space without the lubricating layer Gas in the case of the first embodiment, but in the bearing 14 the lubricating layer G is also provided between the minimum inner periphery face 15d and the flat portion 15c of the retainer 15. However, as in the case of the first embodiment, the lubricating layer G is not provided between the minimum inner periphery face 15 and the inscribed circle S, thus keeping the lubricating layer G out of close contact with the outer periphery face of the roller 4 which projects into the non-lubricating space 12. This makes it possible to reduce the torque produced by the lubricating layer G acting on the outer periphery face of the roller 4 when the roller 4 rolls, resulting in a reduction in the minimum bearing load required in the initial operation, as in the case of the first embodiment.

In addition, because the deepest level of the non-lubricating space 12 is determined on in relation to the minimum inner periphery face 15d of the retainer 15, this eliminates the necessity of using an additional member such as a spacer to create the non-lubricating space 12, resulting in low-cost manufacture.

The first and second embodiment have described a type of bearing in which the shaft 5 is directly inserted in the inside of the rollers 4, but it is needless to say that the present invention is applicable to a bearing having an inner ring (not shown) fitted in the inside of the rollers 4.

What is claimed is:
1. A method for forming a lubricating layer, comprising the steps of:
 a process for inserting a bearing, which has a tubular-shaped retainer holding a plurality of rollers and inserted in an outer ring, in a forming die having an inner diameter greater than an outer diameter of the outer ring of the bearing;
 a process for feeding a fluid lubricant including a thermoplastic resin into the forming die;
 a process for reducing pressure in the forming die with the fluid lubricant fed therein to remove air bubbles included in the fluid lubricant;
 a process for pressing a cylindrical elastic solid, which has an outer shape greater than a minimum inner diameter of the retainer, into an inscribed circle in which the plurality of rollers are inscribed; and
 a process for heating and setting the thermoplastic resin to form a lubricating layer.

* * * * *